United States Patent
Wuest et al.

(10) Patent No.: US 12,462,039 B2
(45) Date of Patent: Nov. 4, 2025

(54) SYSTEM AND METHOD FOR EVALUATING ACTIVE BACKUPS USING PENETRATION TESTING

(71) Applicant: Acronis International GmbH, Schaffhausen (CH)

(72) Inventors: Candid Wuest, Bassersdorf (CH); Philipp Gysel, Bern (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 294 days.

(21) Appl. No.: 18/193,229

(22) Filed: Mar. 30, 2023

(65) Prior Publication Data

US 2024/0330477 A1   Oct. 3, 2024

(51) Int. Cl.
*G06F 21/57* (2013.01)
*G06F 21/53* (2013.01)

(52) U.S. Cl.
CPC ............ *G06F 21/577* (2013.01); *G06F 21/53* (2013.01); *G06F 2221/034* (2013.01)

(58) Field of Classification Search
CPC ... G06F 21/577; G06F 21/53; G06F 2221/034
USPC .......................................................... 726/25
See application file for complete search history.

(56) References Cited

U.S. PATENT DOCUMENTS

| | | | |
|---|---|---|---|
| 9,921,769 B2 | 3/2018 | Aron et al. | |
| 10,042,711 B1 | 8/2018 | Chopra et al. | |
| 11,057,419 B2 * | 7/2021 | Murphy | H04L 67/34 |
| 11,106,632 B2 * | 8/2021 | Bangalore | G06F 16/172 |
| 11,106,792 B2 | 8/2021 | Kostyushko et al. | |
| 11,250,136 B2 | 2/2022 | Mandagere et al. | |
| 11,513,878 B2 | 11/2022 | Kulaga et al. | |
| 2021/0397726 A1 | 12/2021 | Kulaga et al. | |
| 2023/0063529 A1 | 3/2023 | Canfield | |
| 2023/0289443 A1 * | 9/2023 | Sinha | G06F 11/004 |
| 2024/0111857 A1 * | 4/2024 | Luniya | G06F 21/566 |

FOREIGN PATENT DOCUMENTS

| | | |
|---|---|---|
| CN | 109460331 B | 10/2021 |
| CN | 115495360 A | 12/2022 |

OTHER PUBLICATIONS

Wundsam et al., IEEE 210, "Network Troubleshooting with Mirror VNets", pp. 283-287 (Year: 2010).*
Antimalware Scans of Backups: Creating More Security Without Harming Performance or Usability (Acronis Blog), https://www.acronis.com/en-sg/blog/posts/antimalware-backup-archive-scanning/, Sep. 28, 2020.

* cited by examiner

*Primary Examiner* — Khalil Naghdali
(74) *Attorney, Agent, or Firm* — ESPE Legal Consultancy FZ-LLC

(57) ABSTRACT

Systems and methods for verifying a production system automatically by testing a mirror copy of the production system on a testing computer. The system includes a mirror update transporter to deliver a mirror update from the production system to the mirror system, a mounting module to apply the mirror update to the mirror system, a testing computer on which the mirror system is running, a testing module to automatically execute a set of tests on the mirror system, and a communication module to communicate the results of the tests.

20 Claims, 3 Drawing Sheets

SYSTEM AND METHOD FOR EVALUATING ACTIVE BACKUPS USING PENETRATION TESTING

TECHNICAL FIELD

The present disclosure generally relates to information system security and active protection of information system security. In particular, the present disclosure relates to systems and methods for automated dynamic penetration testing on active backups of the production system.

BACKGROUND

Computer systems increasingly manage large amounts of data on behalf of a large number of users. In a typical environment, users are contributing files to the computer system after it has been tested and released. Files that users are contributing sometimes are executable files themselves, either in text format or compiled, or contain executable code in them, for example, like Microsoft Office documents with enabled Macros.

Production systems can be updated by the users or other processes of the system in the form of documents with executable capability, scripts or programs executable by components of that system, as well as additional functionality provided by virtual environments. These updates cannot be verified by simply scanning the production system's file storage. In some cases, additional functions are added to a production system by different development organizations or come from different sources, which makes the testing phase of the formal software release process difficult.

Under these circumstances, a need arises to test the production system after it has been deployed to production. However, the application of existing tests to the production system may affect the system's availability, as some of the tests are designed to be destructive (for example, load and penetration tests). Still other tests may identify defects that can lead to unforeseen conditions which are undesirable in a production environment.

Therefore, there is a need for systems and methods that can validate constantly changing production systems by testing the capabilities of the production system without jeopardizing the security of that production system.

SUMMARY

Embodiments described herein meet the aforementioned needs of the industry. Embodiments utilize modern systems' ability to automatically replicate either themselves or other systems in near-real-time, thus creating mirror images of the source programs.

The present subject matter relates to automatic evaluation of a production system by testing a mirror image of the production system. In accordance with an embodiment, the method for evaluating a production system by testing a mirrored image of the production system is presented.

In an embodiment, a method for evaluating a production system by testing a live mirror image of the production system on a testing computer includes creating a live mirror system as a copy of the production system on a testing computer, obtaining a mirror update comprising one or more changes to the production system since the generation of a previous mirror update, replicating a set of files or other data units associated with the mirror update on the testing computer to apply to the live mirror system, running a set of automatic dynamic tests on the testing computer to evaluate the live mirror system, generating a list of results of execution of each of the tests on the testing computer, wherein the list of results is indicative of at least one vulnerability or defect, and saving the list of results to a computer memory or communicating it to a user.

For dynamic testing, the system is instantiated, in other words, it is not enough to simply test a storage of files that reflect the system. Rather, instructions stored in the files reflective of the system are executed and the system is accordingly live. The production system is represented by the replicated set of backup files.

In contrast to traditional methods for evaluating a computer system, which typically include static scanning of a storage of files without executing these files, embodiments described herein utilize dynamic testing of the system such that the prerequisite to start such testing is to instantiate the system under test, or make it live. Dynamic tests, including dynamic scanning such as vulnerability scanning for example, of IP ports, are tests that evaluate the functionality of the system through different interactions with it.

In some cases, the system is instantiated only when an interaction is made with it, for example, a script is instantiated only when it is called from a graphical user interface or another application. In that case, testing automatically instantiates the system. If the script is a part of a mirrored system, that mirrored system becomes live when a test calls the mirrored system.

A web script located on a web server in some cases is only instantiated when the web server gets a request for a URL address at which the script is visible from the network outside of the web server. In that case, testing instantiates the system. If the web script is a part of a mirrored system, that mirrored system becomes live when the server processes a request for the URL at which that web script is visible from the network outside of the web server.

In some cases, mirroring can be done without affecting the functionality of the destination system that is being mirrored, for example, when scripts, web scripts, or database are mirrored.

In other cases, when the change that is delivered to the destination comprises a part of, for example, a loaded executable, there may be a need to stop the system, apply the change and restart the system before running the dynamic automatic scripts if the system was already running. Or, if the system was not running, there may be a need to instantiate that system prior to running the dynamic automatic scripts.

Embodiments can utilize various system functions that replicate data to a mirror database. For example, when deployed in a production environment, a replication function can effectively replicate a production database into another environment. Further, embodiments can utilize virtual machine mirroring or live cloning that creates near-real-time copies of production virtual environments. Embodiments can further utilize backup copies or snapshots of computer files or volumes. For example, backup copies or snapshots can be created even when the computer files or volumes are in use, thereby allowing for near-real-time file replication. Embodiments can further utilize file replication and file synchronization for near-real-time file replication such as on a file change. Embodiments can further utilize mirroring achieved by only copying changes detected within the source system to the mirror system, thus allowing for small near-real-time changes to the mirror system.

In an embodiment, the production system is at least one of a virtual machine, a container, a scripting engine, or a web server.

In an embodiment, obtaining the mirror update comprises using a file synchronization system with a shadow copy method to detect changes to the files on the production system.

In an embodiment, obtaining a mirror update comprises using database mirroring or a replication functionality on the production system.

In an embodiment, obtaining a mirror update is performed by an external system.

In an embodiment, the live mirror system is created when the production system is live.

In an embodiment, at least one of the obtaining the mirror update, replicating the set of files, or the application of the set of files to the live mirror system is stopped before the running the set of dynamic automatic tests on the live mirror system on the testing computer starts.

In an embodiment, at least one of the obtaining the mirror update, replicating the set of files, or the application of the set of files to the live mirror system continues while the running the set of dynamic automatic tests on the testing computer executes.

In an embodiment, at least one of the obtaining the mirror update, replicating the set of files, or the application of the set of files to the live mirror system resumes after the running the test of dynamic automatic tests on the live mirror system on the testing computer has finished.

In an embodiment, a method further includes creating a full backup of the production system or an incremental backup of the production system, and applying the full backup or the incremental backup to the live mirror system on the testing computer.

In an embodiment, a method further includes delivering the list of results to a user by at least one of sending an electronic communication, displaying on a display unit of user's computer, printing in a print media or publishing in electronic media.

In an embodiment, running the set of dynamic automatic tests is implemented by an automated dynamic testing system having a local testing agent installed onto the testing system before dynamic automatic testing is performed.

In an embodiment, a method further includes comparing a current list of results with a list of results corresponding to one or more previous backups of the production system, identifying at least one differentiating factor indicative of a vulnerability, and communicating the at least one differentiating factor to a user.

In an embodiment, a method further includes tracking at least one emerging new threat or vulnerability as detected by threat intelligence, and revising the set of dynamic automatic tests for testing the live mirror system on the testing computer.

In an embodiment, a system for evaluating a production system by testing a live mirror image of the production system includes a testing computer configured to run a live copy of the production system as a live mirror system, a mirror update transporter configured to obtain a mirror update comprising changes to the live production system that occurred since a previous mirror update, and to deliver the mirror update to the testing computer to create a near real-time copy of the production system on the live mirror system, a mounting module configured to apply the mirror update to the live mirror system, a testing module configured to run a set of dynamic automatic tests against the live mirror system on the testing computer to evaluate the production system for at least one vulnerability or defect, and generate a list of results of execution of the set of tests on the testing computer, wherein the list of results is indicative of the at least one vulnerability or defect, save the list of results in computer memory or communicate it to a user.

In an embodiment, a system further includes a mirror update backup generator configured to generate the mirror update.

In an embodiment, the production system is at least one of a virtual machine, a virtual environment, a container, a scripting engine, or a web server.

In an embodiment, a system further includes a communication module to deliver the list of results to a user by sending an electronic communication, displaying on a display unit of a user's computer, printing in a print media or publishing in electronic media.

In an embodiment, the testing module is further configured to collect the list of results from each iteration of the testing against the live mirror system and store the list of results from each iteration of the testing for analysis.

In an embodiment, a system further includes a communication module configured to compare a current list of results with a list of results corresponding to one or more previous backups of the production system, identify at least one differentiating factor indicative of a vulnerability and communicate the at least one differentiating factor to a user.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
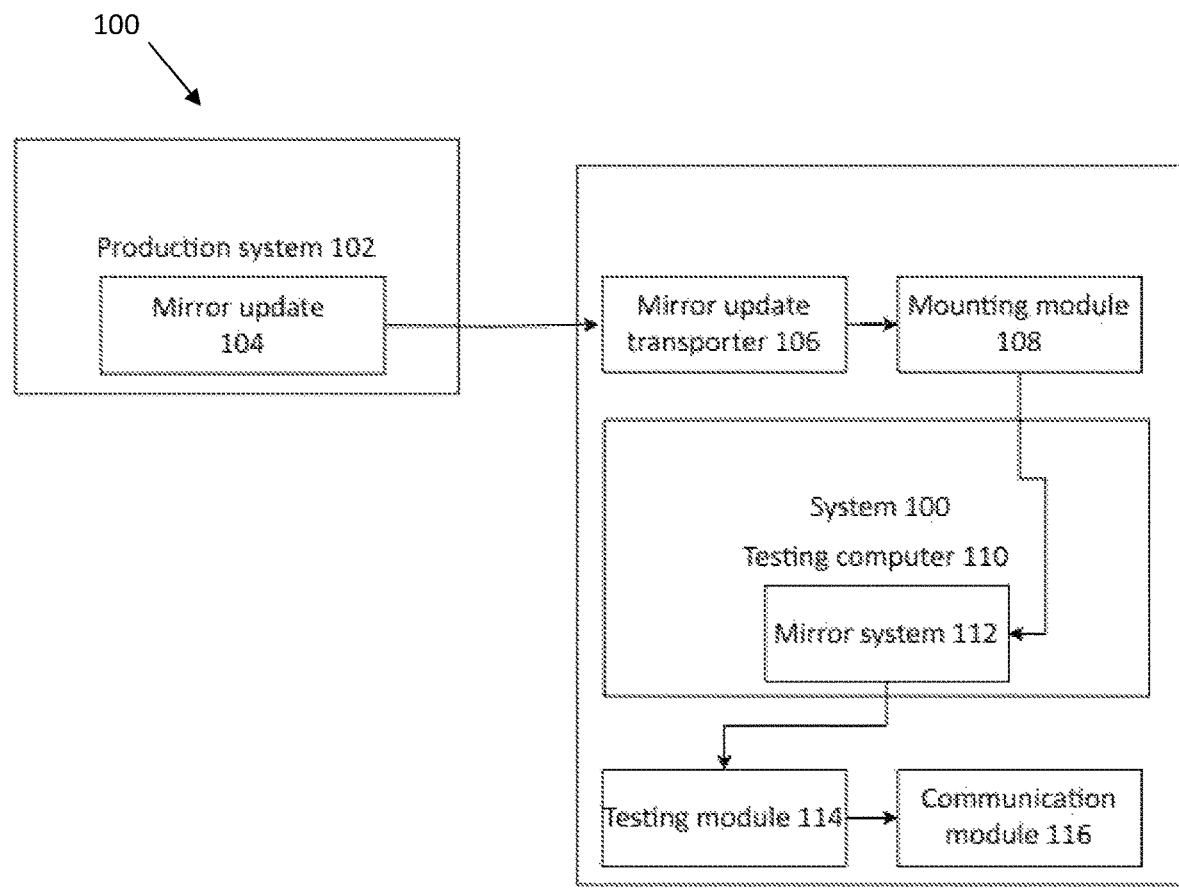
FIG. 1 is a block diagram of a system, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Automatic testing has been proven a quintessential tool for identifying the vulnerabilities and defects in complex systems, but the application of automatic tests are not free from challenges. For example, application of these tests in the production environment may require additional steps that lead to lowering the level of system protection or effectively damaging the system. For example, the performing of certain tests may require deactivation of production intrusion detection system tools. When IDS tools are deactivated, the risk of an attack during the deactivation period increases. Accordingly, the present disclosure presents systems and methods to verify a production system by testing a mirror image of the production system without having to deactivate IDS tools or interrupt the production.

With the proliferation of digitization, information system security and the correct functionality of production systems have become critical aspects to protect software applications from malicious attacks or failures caused by threat agents or events. Moreover, as the amount of data contained within the application or the number of users increases, embodiments further effectively handle computational load, load balancing, or handling spikes in user or computational activity.

Embodiments described herein utilize automatic testing, such as dynamic penetration tests, SQL, scripting, and HTML injection tests, load, and stress testing on the system in the testing environment. Automatic testing identifies, among other things, if the current hardware configuration is sufficient to cater the application's operational requirements and if corrective action is necessary to mitigate the misconfiguration before the application is exploited by attackers.

Automatic tests are designed to test the system above and beyond the normal functionality and defense mechanisms of the system in order to detect potential vulnerabilities and defects. As such, embodiments described herein can test the production system without causing failure of the production system, and without interruptions in the production environment.

Further, because systems in production are constantly changing (e.g. increase or change of the user load), as the number of users accessing the system grows, the amount of information stored within that system increases, the data transferred between internal and external system components becomes higher. Embodiments are therefore able to handle constantly-changing production systems.

Further, many systems act as scripting engines. For example, in many cases, web servers accept scripting files that add functionality exposed through these web servers and which do not even need to be compiled. The addition of executable code to the web server changes the functionality profile of the system that contains that web server. Other scripting engines include the ability to execute Batch files, such as on Windows and Linux—Shell scripts.

A separate class of dynamic additions to the systems are virtual environments, virtual machines, and containers. These can be added to the system as collections of files and later be instantiated as full-blown computers with their own functionality and storage. Embodiments are therefore able to handle all of the aforementioned production environments.

Referring to FIG. 1, a block diagram of a system 100 is depicted, in accordance with an embodiment. The system 100 is configured to perform automated testing on a mirror of a production system 102.

In an embodiment, the system 100 comprises a mirror update transporter 106, a mounting module 108, a testing computer 110 running the mirror system 112, a testing module 114, and a communication module 116.

In an embodiment, the production system 102 is a tool implemented to provide functionality to plan and execute projects from beginning to end, while automating the material planning, production tracking and scheduling, and product lifecycle management. In an embodiment, the projects or products can be a software project and a software product. In an embodiment, the production system 102 has one or more software projects in a planning or execution state concurrently. In an embodiment, the production system 102 comprises a virtual machine, a virtual container, a scripting engine, or a web server with executable binary or scripting code.

One or more changes to the production system 102 pertaining to any live project can be detected and recorded. In an embodiment, every change to the production system 102 can be detected and recorded. In another embodiment, changes to the production system 102 can be selectively detected and recorded. In an embodiment, the production system 102 makes a copy of the detected changes. In another embodiment, an outside system (such as system 100) detects changes made to the production system 102 and makes a copy of the detected changes.

In an embodiment, a mirror update 104 comprising the changes made to the production system 102 since the last mirror update is generated. The mirror update 104 can comprise any collection of data units in any computer memory such as files, electronic messages, or data structures.

In an embodiment, the mirror update 104 is created by the system 100 after a full backup of the production system 102 has been created, copied to the testing computer 110 and mounted or mounted on the testing computer 110 as an initial mirror system 112. In embodiments, the testing computer 110 can be updated using the mirror update 104, and updated based on additional mirror update(s) 104.

In an embodiment, the system 100 is configured to access the mirror update 104 of the production system 102 and perform automatic testing on a corresponding mirror system 112. In an embodiment, the system 100 is implemented on the testing computer 110. In an embodiment, the testing computer 110 is a portable electronic device such as a smartphone, tablet, single board computer, smart device, or laptop, a virtual computer, or a personal desktop computer.

The system includes various engines or modules, each of which is constructed, programmed, configured, or otherwise adapted, to autonomously carry out a function or set of functions. The term engine or module as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an embodiment, the mirror update transporter 106 is configured to receive e changes detected in the production system 102. In an embodiment, the mirror update transporter 106 is configured to receive changes detected since a last or previous communication and transport a data package corresponding to the changes detected.

In an embodiment, the mirror update transporter 106 is configured to copy a set of files or other data units 104 comprising the changes detected in the production system 102 (for example, since the last communication). The mirror update transporter 106 is configured to replicate the set of files or other data units to the testing computer 110 by applying the changes communicated in the last communication to an existing mirror image of the production system 102 to create an updated mirror system 112 of the production system 102. In an embodiment, the system 100 has a local storage to store the files or other data units comprising changes detected in the production system 102 since the last mirror update 104. In another embodiment, the files or other data units comprising changes detected in the production system 102 since the last mirror update 104 are stored on a remote storage, or a server connected to the system 100, and by copying these files and appending them to the existing mirror image, a mirror system 112 is updated. In another embodiment, the files or other data units comprising changes detected in the production system 102 since the last mirror update are communicated directly to the mounting module 108 without saving them on an intermediate storage.

In an embodiment, the mirror system 112 of the production system 102 is generated when the production system 102 is live. In an embodiment, a full backup of the production system 102 is created and copied to the testing computer 110 prior to operations using mirror update 104. The mirror system 112, replicating the production system 102, is then started and made available for the testing. In an embodiment, the mirror system 112 is started in the cloud backend and then made available for testing.

Accordingly, in an embodiment, a mirroring process includes the operations of creating a mirror update (such as mirror update 104), transporting the mirror update to a testing device (such as via the mirror update transporter 106 on system 100 and/or the testing computer 110), and applying the mirror update to the testing device to create a mirrored system (such as using the mounting module 108 to create the mirror system 112). In embodiments, the mirroring process can include additional or fewer operations.

In an embodiment, the mirroring process stops prior to the beginning of a testing process (for example, operations by testing module 114).

In an embodiment, the mirroring process resumes after the testing process is completed.

In an embodiment, the mirroring process does not stop during the testing process.

In an embodiment, a full backup of the production system 102 or an incremental backup of the production system is created and replicated to the mirror system 112 after testing completes, prior to resuming the mirroring process.

In an embodiment, the mirror system 112 is mounted or started prior to the beginning of the testing process.

In an embodiment, the mirror system 112 is dismounted or stopped after the testing is concluded.

In an embodiment, the system 100 is connected to the production system 102 through a network, and the mirror updates 104 of the production system 102 are generated by the system 100. The generated mirror update 104 is then communicated by the mirror update transporter 106 to the mounting module 108 to amend and the mirror system 112 on the testing computer 110 with the mirror update 104.

In an embodiment, the system 100 further comprises a mounting module 108 configured to apply changes from the production system 102 communicated in the mirror update 104 to the mirror system 112 running on the testing computer 110. Mounting is a process by which the mirror system 112 running on the testing computer 110 becomes identical to the production system 102 as it existed at the time of the generation of the last mirror update 104.

In an embodiment, the system 100 further comprises a testing module 114. The testing module 114 is a component configured to apply automated tests to the mirror system 112 to identify any potential for vulnerabilities and/or defects. In an embodiment, the testing module 114 is further configured to generate a list of results of execution of one or more tests on the testing computer 110. For example, the testing module 114 can execute each of a plurality of predefined tests. In an embodiment, predefined tests can be the tests developed during the testing phase of the software development life cycle before the system was deployed to production. In another embodiment, one or more tests can be dynamically-generated. The list of results is indicative of the presence of vulnerabilities and/or defects. In an embodiment, the testing comprises functional testing, penetration testing, or load testing.

In an embodiment, the testing module 114 is further configured to collect the generated list of results from each iteration of the testing and store the collected lists in a file or a database. The stored lists of results can be used later, for example, for statistical analysis.

In an embodiment, the testing module 114 is further configured to compare the current generated list of results with a previously-stored list of results corresponding to one or more previous backups of the production system 102. In an embodiment, by comparing the current and previous lists, the system 100 identifies one or more differentiating factors which are indicative of vulnerabilities or defects. For example, if the testing module 114 automatically assigns severity levels to discovered vulnerabilities or defects, the system can perform actions determined by the severity of the discovered vulnerability or defect. In an embodiment, the testing module 114 can automatically create a report in a trouble tracking system, alert stakeholders, or send a notification to production to stop or block functionality of a certain affected element. The differentiating factors, along with suggestions to mitigate the threats or vulnerabilities, then can be highlighted and communicated to the users, operators, analysts, or stakeholders. Examples of such results are for example, listings of unpatched services, usage of default credentials, open network ports, which allow to discover misconfigurations, vulnerabilities, or other issues, such as open directory listings, default passwords and RemoteFileInclusion vulnerabilities.

In an embodiment, the system 100 further comprises a communication module 116 configured to deliver the generated list of results to the users or operators. As the list of results is an indication of the present vulnerabilities, sufficiency of the hardware configuration, and/or requirement of corrective actions, the results can be communicated to the users, operators, analyzers, or stakeholders of the system 100. The modes of communication can include, but may not be limited to: an electronic communication, displaying on a display unit of a stakeholder's computer, printing in a print media, or publishing in electronic media.

Accordingly, in an embodiment, the mirror system 112 can be tested by the testing module 114 with vulnerability and security testing tools.

Though not depicted in FIG. 1, in an embodiment, the system 100 can further comprise a tracking component. The tracking component is configured to continuously track emerging new threats and vulnerabilities. For example, the tracking component can be operably coupled to sources of detected threat intelligence. Threat intelligence can be collected from one or more different sources and new CVEs can be reported to the tracking component. In one example, the tracking component can detect a new threat by comparing the list of results with previous lists or by comparing the detected threat with a database of known threats. The tracking component is further configured to revise pre-defined tests for testing the mirror system 112 on the testing computer 110.

In an embodiment, the system 100 is configured to enumerate one or more newly created files and/or any currently-running processes since the last testing. In an embodiment, enumeration is possible as the system 100 is in a running state. The system 100 can then compare the result of testing using the one or more newly created files and/or any currently-running processes with a previous backup test. In an embodiment, comparison can be made to the most recent test results, the results of older backups and/or comparison it across other computers of a company or network.

In an embodiment, current changes, such as newly added files and especially newly running processes, are highlighted. Any newly discovered file belonging to a group of active content type, such as executables, DLLs and PowerShell scripts, can then be analyzed more thoroughly. Testing of newly updated files can be prioritized higher than existing non-updated files. Executable files can also be executed and run on the mirror system 112.

In an embodiment, described with reference to FIG. 1, the production system 102 is a virtual machine. In another embodiment, the production system 102 is a virtual container. A container is a unit of software that packages code and its dependencies, so the application runs quickly and reliably across computing environments.

In an embodiment, the production system 102 is implemented as a web server. On the hardware side, a web server is a computer that stores web server software and a website's component files (for example, HTML documents, images, CSS stylesheets, and JavaScript files). The web server connects to the Internet and supports physical data interchange with other devices connected to the web. In an embodiment, the mirror system 112 as a web server is a copy of production system 102 as a web server. In an embodiment, a one-way file synchronization application using the Shadow Copy service allows for detecting, collecting, and transferring all changes detected in scripting files from the production system 102 as a web server to the mirror system 112 as a web server. In an embodiment, testing of the mirror system 112 as a web server starts on schedule. In another embodiment, the beginning of the automated process is triggered by the amount or other characteristics of changes communicated to the mirror system 112 as a web server from the production system 102 as a web server.

In yet another embodiment, the production system 102 is a scripting engine. A scripting engine is a computer programming language interpreter, whose function is to interpret the programming text of users, translate such text into machinery code executable by computers, and to complete a series of functions.

In that embodiment, the mirror system 112 as a scripting engine is a copy of a production system 102 as a scripting engine In an embodiment, a one-way file synchronization application using the Shadow Copy service allows for detecting, collecting, and transferring all changes detected in scripting files from the production system 102 as a scripting engine to the mirror system 112 as a scripting server. In an embodiment, testing of the mirror system 112 as a scripting engine starts on schedule. In another embodiment, the beginning of the automated process is triggered by the amount or other characteristics of changes communicated to the mirror system 112 as a scripting engine from the production system 102 as a scripting engine.

Figure 2:
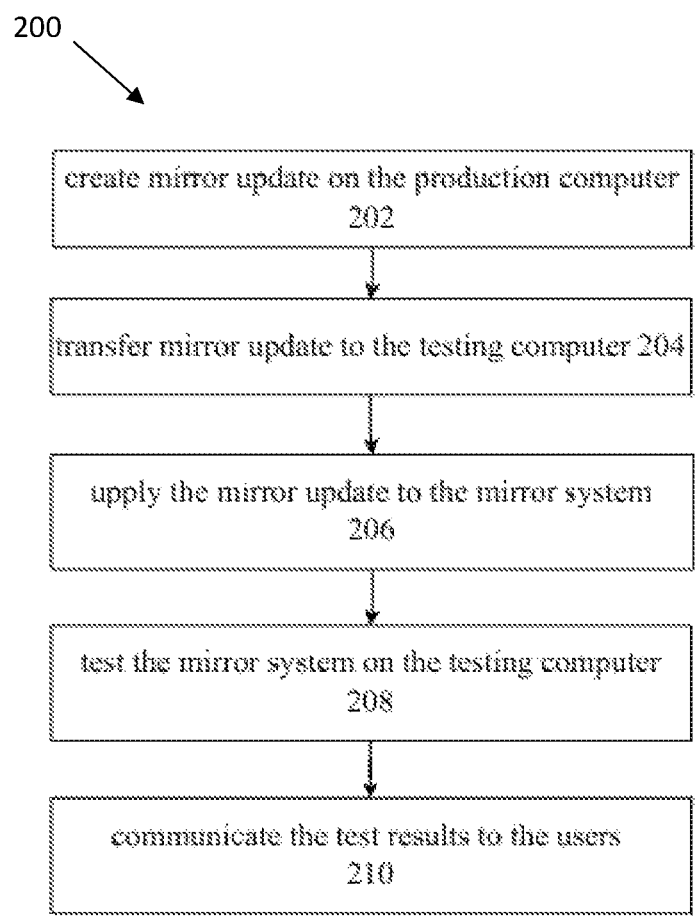
FIG. 2 is a flowchart of a method for verifying a production system, in accordance with an embodiment.

Referring to FIG. 2, a flowchart of a method for verifying a production system 102 by testing a mirror system 112 of the production system 102 is depicted, in accordance with an embodiment. At 202, a backup generator generates a new mirror update of the production system 102 comprising changes to the production system 102 since a mirror update. For example, with further reference to FIG. 1, mirror update 104 can be generated and includes changes to the production system 102 since the last mirror update 104. At 202, production system 102 can generate mirror update 104. In another embodiment, system 100 can generate mirror update 104.

At 204, the mirror update transporter 106 transports the mirror update 104 and communicates it to the mounting module 108 by storing the mirror update 104 in storage in a location accessible by the mounting module 108 of the system 100. In another embodiment, the files or other data units comprising the mirror updates are communicated directly to the mounting module 108 and are never saved to an intermediate storage.

At 206, the mounting module 108 receives the mirror update 104 and applies the mirror update 104 to the mirror system 112. As a result, the mirror system 112 becomes equivalent to the production system 102 as it existed at or near the moment when the mirror update 104 was generated.

At 208, tests are applied to the updated mirror system 112 running on the testing computer 110 by the testing module 114. In an embodiment, the testing module 114 can execute tests on mirror system 112 automatically after an update such that the testing module 114 is triggered by the mounting module 108.

In an embodiment, the incremental changes in the mirror update 104 are analyzed using a predefined set of rules or criteria to identify modules of the mirror system 112 which affect the testing computer 110. In an embodiment, the incremental changes are tested by the testing module 114 by applying one or more tests or set of rules to the mirror system 112 in order to identify vulnerabilities and/or defects based on the list of affected modules of the mirror system 112.

In an embodiment, the testing module 114 implements pre-configured tests. Examples of the tests are penetration tests and functional tests. In another embodiment, the testing module implements dynamic tests.

In an embodiment, at 208, the testing module 114 is further configured to analyze the test results and identify if any corrective action needs to be taken. In an embodiment, the testing module 114 creates a report reflecting the results of executing automatic tests indicative of identified vulnerabilities and defects and passes the report or a pointer to the report to the communication module 116.

In an embodiment, at 208, the test results are compared against previous results to determine the presence of threat or vulnerability. In an embodiment, at 208, the automatic test results can be compared to the preceding test results. In another embodiment, the automatic test results can be compared to the results of tests from older backups.

At 210, the test results report is communicated by the communication module 116 to the user, operator, admin, analyst, or other stakeholder.

Figure 3:
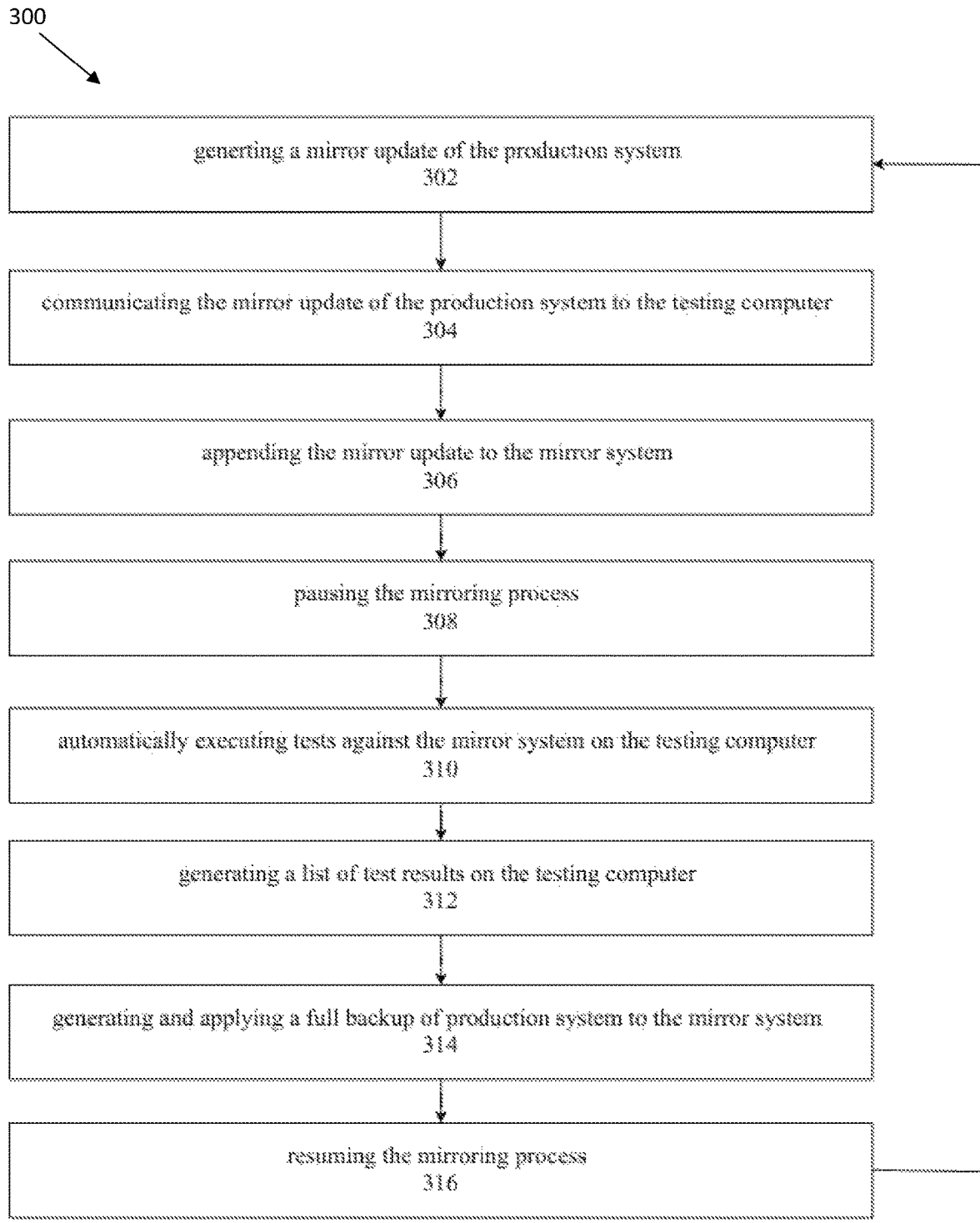
FIG. 3 is a flowchart of a method for verifying a production system by testing active backups of the production system, in accordance with an embodiment.

Referring to FIG. 3, a flowchart of a method for verifying a production system 102 by testing a mirror system 112 including pausing the mirroring process for the testing operation and resuming the testing operation after applying a full backup to the mirror system 112 is depicted, in accordance with an embodiment. At 302, the mirror update 104 of the production system 102 is obtained by the system 100. In another embodiment, the mirror update 104 of the production system 102 is generated by the production system 102. In another embodiment, the mirror update 104 of the production system 102 is generated by the system 100.

At 304, a copy of the mirror update 104 is received by the mounting module 108.

At 306, the mounting module 108 appends or otherwise applies the changes received in the mirror update 104 to the mirror system 112 on the testing computer 110.

At 308, the mirroring process is paused. Pausing of the mirroring process can be utilized to ensure that all files within the system are saved in a coherent state: for example, to prevent an instance when only a part of the intended change was "flushed" to the file, and the remaining part is only waiting in the queue to be saved. For example, once a first mirror update 104 is applied to the mirror system 112, no additional mirror updates 104 are applied (until later un-paused). In an embodiment, pausing can include placing one or more of the engines of system 100 into a holding loop until otherwise instructed. In another example, the mirror update transporter 106 can be temporarily disabled or otherwise instructed to not receive additional mirror updates 104. In another example, the mounting module 108 can be temporarily disabled or otherwise instructed to not apply additional changes to mirror system 112.

At 310, a set of predefined tests is applied to the mirror system 112 on the testing computer 110 to validate the production system 102 and identify if any vulnerabilities or defects are present in the production system 102.

At 312, a list of results of execution of each of the pre-defined tests is generated on the testing computer 110. The result is indicative of the presence of vulnerabilities or defects.

At 314, a full or an incremental backup of the production system 102 is generated, delivered to the mounting module 108 and applied to the mirror system 112 on the testing computer 110 to account for changes that accumulated on the production system 102 during the testing process on the mirror system 112.

At 316, the mirroring process resumes after completion of the automatic testing to make sure that the mirror image of the production system closely resembles that production system in near-real-time, and a new mirror update 104 of the production system 102 is received by the mirror update transporter 106. For example, at 316, the mirroring process paused at 308 can be un-paused such that additional mirror updates 104 can be applied to mirror system 112. In an embodiment, resuming can include any one or more of the engines of system 100 exiting a holding loop. In another example, the mirror update transporter 106 can be re-enabled or otherwise instructed to again receive additional mirror updates 104. In another example, the mounting module 108 can be temporarily re-enabled or otherwise instructed to again apply additional changes to mirror system 112.

The invention claimed is:

1. A method for evaluating a production system by testing a live mirror image of the production system on a testing computer, the method comprising:
   creating a live mirror system as a copy of the production system on a testing computer;
   obtaining a mirror update comprising one or more changes to the production system since the generation of a previous mirror update;
   replicating a set of files or other data units associated with the mirror update on the testing computer to apply to the live mirror system;
   running a set of automatic dynamic tests on the testing computer to evaluate the live mirror system;
   generating a list of results of execution of each of the tests on the testing computer, wherein the list of results is indicative of at least one vulnerability or defect; and
   saving the list of results to a computer memory or communicating it to a user, wherein at least one of:
   obtaining the mirror update is stopped before the running the set of dynamic automatic tests on the live mirror system on the testing computer starts,
   replicating the set of files is stopped before the running the set of dynamic automatic tests on the live mirror system on the testing computer starts, or
   applying the set of files to the live mirror system is stopped before the running the set of dynamic automatic tests on the live mirror system on the testing computer starts.

2. The method of claim 1, wherein the production system is at least one of a virtual machine, a container, a scripting engine, or a web server.

3. The method of claim 1, wherein obtaining the mirror update comprises using a file synchronization system with a shadow copy method to detect changes to the files on the production system.

4. The method of claim 1, wherein obtaining a mirror update comprises using database mirroring or a replication functionality on the production system.

5. The method of claim 1, wherein obtaining a mirror update is performed by an external system.

6. The method of claim 1, wherein the live mirror system is created when the production system is live.

7. The method of claim 1, wherein at least one of:
   obtaining the mirror update continues while the running the set of dynamic automatic tests on the testing computer executes,
   replicating the set of files continues while the running the set of dynamic automatic tests on the testing computer executes, or
   applying the set of files to the live mirror system continues while the running the set of dynamic automatic tests on the testing computer executes.

8. The method of claim 1, wherein at least one of:
   obtaining the mirror update resumes after the running the test of dynamic automatic tests on the live mirror system on the testing computer has finished,
   replicating the set of files resumes after the running the test of dynamic automatic tests on the live mirror system on the testing computer has finished, or applying the set of files to the live mirror system resumes after the running the test of dynamic automatic tests on the live mirror system on the testing computer has finished.

9. The method of claim 1, further comprising:
creating a full backup of the production system or an incremental backup of the production system; and
applying the full backup or the incremental backup to the live mirror system on the testing computer.

10. The method of claim 1, further comprising delivering the list of results to a user by at least one of:
sending an electronic communication;
displaying on a display unit of user's computer;
printing in a print media; or
publishing in electronic media.

11. The method of claim 1, wherein the running the set of dynamic automatic tests is implemented by an automated dynamic testing system having a local testing agent installed onto the testing system before dynamic automatic testing is performed.

12. The method of claim 1 further comprising:
comparing a current list of results with a list of results corresponding to one or more previous backups of the production system;
identifying at least one differentiating factor indicative of a vulnerability; and
communicating the at least one differentiating factor to a user.

13. The method of claim 1 further comprising:
tracking at least one emerging new threat or vulnerability as detected by threat intelligence; and
revising the set of dynamic automatic tests for testing the live mirror system on the testing computer.

14. A system for evaluating a production system by testing a live mirror image of the production system, the system comprising:
a testing computer configured to run a live copy of the production system as a live mirror system;
a mirror update transporter configured to obtain a mirror update comprising changes to the live production system that occurred since a previous mirror update, and to deliver the mirror update to the testing computer to create a near real-time copy of the production system on the live mirror system;
a mounting module configured to apply the mirror update to the live mirror system;
a testing module configured to:
run a set of dynamic automatic tests against the live mirror system on the testing computer to evaluate the production system for at least one vulnerability or defect,
and generate a list of results of execution of the set of tests on the testing computer, wherein the list of results is indicative of the at least one vulnerability or defect,
save the list of results in computer memory or communicate it to a user,
wherein at least one of:
obtaining the mirror update is stopped before the running the set of dynamic automatic tests on the live mirror system on the testing computer starts,
replicating a set of files associated with the live mirror update is stopped before the running the set of dynamic automatic tests on the live mirror system on the testing computer starts, or
applying mirror update to the live mirror system is stopped before the running the set of dynamic automatic tests on the live mirror system on the testing computer starts.

15. The system of claim 14, further comprising:
a mirror update backup generator configured to generate the mirror update.

16. The system of claim 14, wherein the production system is at least one of a virtual machine, a virtual environment, a container, a scripting engine, or a web server.

17. The system of claim 14, further comprising:
a communication module to deliver the list of results to a user by:
sending an electronic communication;
displaying on a display unit of a user's computer;
printing in a print media; or
publishing in electronic media.

18. The system of claim 14, wherein the testing module is further configured to collect the list of results from each iteration of the testing against the live mirror system and store the list of results from each iteration of the testing for analysis.

19. The system of claim 14, further comprising:
a communication module configured to:
compare a current list of results with a list of results corresponding to one or more previous backups of the production system;
identify at least one differentiating factor indicative of a vulnerability; and
communicate the at least one differentiating factor to a user.

20. The method of claim 1, wherein replicating a set of files or other data units associated with the mirror update comprises enumerating one or more newly created files or currently-running processes since a last evaluation.

* * * * *